(12) United States Patent
Tokuda et al.

(10) Patent No.: US 10,684,177 B2
(45) Date of Patent: Jun. 16, 2020

(54) ENVIRONMENT HISTORY DISPLAY OBJECT, DATA PROCESSING METHOD USING SAME, DATA PROCESSING DEVICE, AND QUALITY MANAGEMENT METHOD (71) Applicant: Hitachi, Ltd., Tokyo (JP)

(72) Inventors: Yuya Tokuda, Tokyo (JP); Tomotoshi Ishida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/304,702

(22) PCT Filed: Apr. 13, 2017

(86) PCT No.: PCT/JP2017/015071
§ 371 (c)(1),
(2) Date: Nov. 27, 2018

(87) PCT Pub. No.: WO2017/208641
PCT Pub. Date: Dec. 7, 2017

(65) Prior Publication Data
US 2019/0219454 A1 Jul. 18, 2019

(30) Foreign Application Priority Data
Jun. 2, 2016 (JP) .................................. 2016-110564

(51) Int. Cl.
*G06K 19/00* (2006.01)
*G01K 11/12* (2006.01)
(Continued)

(52) U.S. Cl.
CPC ................ *G01K 11/12* (2013.01); *G06K 7/14* (2013.01); *G06K 7/1413* (2013.01);
(Continued)

(58) Field of Classification Search
USPC ................. 235/375–385, 435, 439, 454, 462
See application file for complete search history.

(56) References Cited

U.S. PATENT DOCUMENTS 6,382,125 B1 5/2002 Tamura
2009/0302102 A1 12/2009 Nemet et al.
(Continued)

FOREIGN PATENT DOCUMENTS

JP 2001-091368 A 4/2001
JP 2001-194248 A 7/2001
(Continued)

OTHER PUBLICATIONS

International Search Report of PCT/JP2017/015071 dated Jul. 11, 2017.

*Primary Examiner* — Matthew Mikels
(74) *Attorney, Agent, or Firm* — Mattingly & Malur, PC (57) ABSTRACT

The purpose of the present invention is to provide an environment history display object whereby a storage environment history including time can easily be grasped. In order to solve the above problem, the environment history display object pertaining to the present invention is capable of determining the presence/absence of deviation from a management environment, and is characterized by being provided with a plurality of display parts having a plurality of marks for irreversibly changing color upon leaving a set environment range, the times taken for the plurality of marks to change color after leaving the environment range being mutually different, and the environment range being different for each display part.

7 Claims, 5 Drawing Sheets

(51) Int. Cl.
*G06K 19/06* (2006.01)
*G06K 7/14* (2006.01)

(52) U.S. Cl.
CPC ........... *G06K 7/1417* (2013.01); *G06K 19/06* (2013.01); *G06K 19/0614* (2013.01); *G06K 19/06018* (2013.01); *G06K 19/06037* (2013.01); *G06K 19/06046* (2013.01)

(56) References Cited

U.S. PATENT DOCUMENTS

2014/0229251 A1* 8/2014 Lim .................. G06Q 30/0252
                                                              705/14.5
2016/0292486 A1* 10/2016 Prusik .................. G06K 7/1473

FOREIGN PATENT DOCUMENTS

| | | |
|---|---|---|
| JP | 2002-037420 A | 2/2002 |
| JP | 2002-358591 A | 12/2002 |
| JP | 5563565 B2 | 7/2014 |

\* cited by examiner

ENVIRONMENT HISTORY DISPLAY OBJECT, DATA PROCESSING METHOD USING SAME, DATA PROCESSING DEVICE, AND QUALITY MANAGEMENT METHOD

TECHNICAL FIELD

The present invention relates to a display object, a data processing device, a data processing method and a quality management method respectively for managing an environmental condition in transportation and storage mainly in the transportation and storage of articles.

BACKGROUND ART

As for a part of articles transported from a manufacturing location to a consumed location, appropriate management of an environmental condition in temperature, humidity, vibration, gas, atmospheric pressure and others is required. For example, for the part of articles, food turned a condition unsuitable for consumption because of decomposition and a change of taste when the food is located in environment exposed to high temperature and low temperature can be given. In addition, for an example, food the quality of which is deteriorated when the food is located in environment exposed to high humidity and environment in which oxygen in the atmosphere exists can be given. Moreover, for an example, an article broken when vibration exceeding supposition is applied to the article can be given.

To cope with such a problem, a countermeasure such as putting an article to be an object in a sealed container when the article is transported or stored and managing temperature, humidity and vibration using an air conditioner in a transport container, a transport truck and a storage room is taken.

However, a managed range may deviate due to failure of the air conditioner, negligence of management and others. Then, to judge whether deviation occurs or not, the following devices and methods exist.

Patent Literature 1 discloses a method of applying a temperature-indicating member the color of which changes depending upon temperature to an article to be managed and reading a code shown by an adjacent bar code and color of the temperature-indicating member by a reader. Further, Patent Literature 1 discloses a method of analyzing the read code and the read color data and estimating a temperature history. In addition, Patent Literature 1 also discloses a method of realizing the temperature-indicating member the color of which changes depending upon temperature.

Patent Literature 2 discloses a method of applying plural bar codes the respective color and uncolor of which change depending upon a temperature range to an article and reading only the single bar code depending upon temperature in reading. Further, Patent Literature 2 discloses a method of transmitting its read data to a computer for quality management.

CITATION LIST

Patent Literature

Patent Literature 1: Japanese Unexamined Patent Application Publication No. 2001-91368
Patent Literature 2: Japanese Patent No. 5563565

SUMMARY OF INVENTION

Technical Problem

When the article deviating from the managed range is detected by the devices and the methods disclosed in Patent Literatures 1, 2, it is general that the method of managing the article when the article deviates from the managed range is improved. To request staff in charge of management to improve the situation, it is required to present evidence that the article deviates from its managed range. To realize this, it is necessary to record appearance in image data of the article and management information. However, as image data requires large capacity, compared with a bar code and environmental data such as temperature, capacity of a memory required for recording all data becomes enormous.

Then, the present invention has it as an object to provide an environment history display object on the basis of which a data storage amount or a transmission amount can be automatically adjusted, a data processing device, a data processing method and a quality management method respectively using the environment history display object.

Solution to Problem

To solve the abovementioned problem, the present invention has a characteristic that the environment history display object according to the present invention is provided with an environment changed part and a one-dimensional code or a two-dimensional code and that the one-dimensional code or the two-dimensional code is provided with information related to determination criteria of whether record or transmission of image data of the environment changed part is required or not.

Advantageous Effects of Invention

According to the present invention, the environment history display object on the basis of which a data storage amount or a transmission amount can be automatically adjusted, the data processing device, the data processing method and the quality management method respectively using the environment history display object can be provided.

According to the present invention, the following effects can be acquired.

DESCRIPTION OF EMBODIMENTS

Embodiments will be described using the drawings below.

First Embodiment

Figure 1:
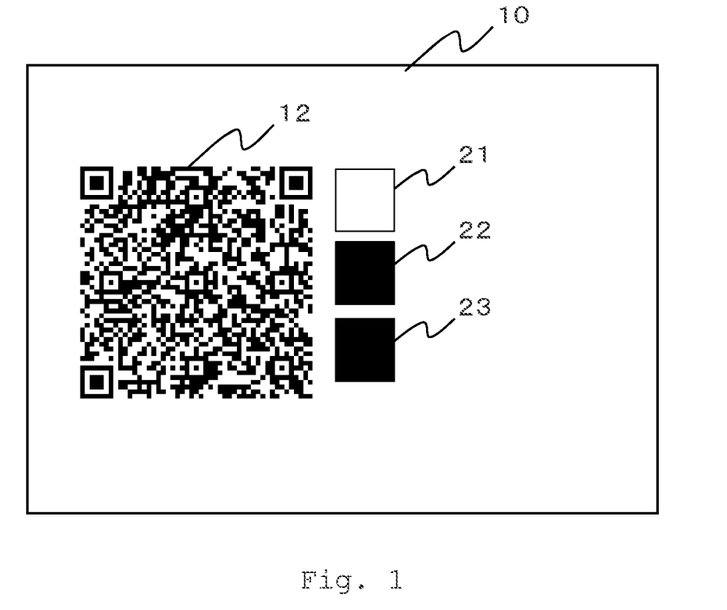
FIG. 1 shows an environment history display object according to a first embodiment.
Figure 2:
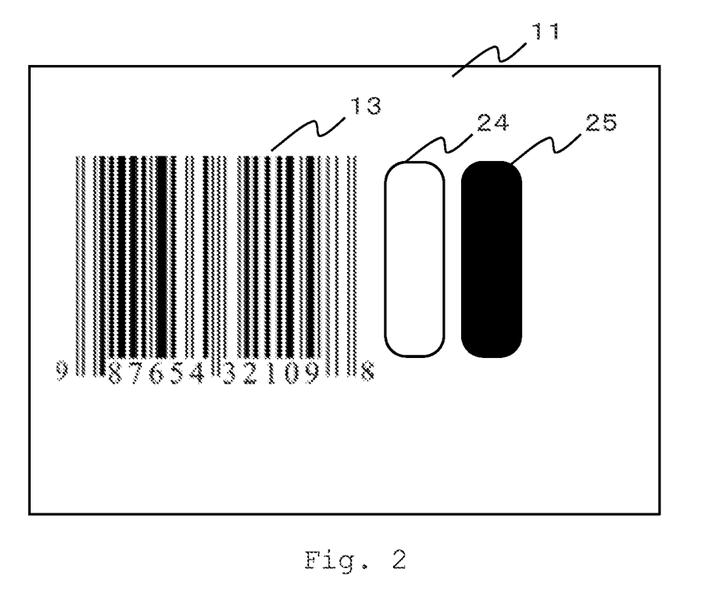
FIG. 2 shows an environment history display object according to the first embodiment.

FIG. 1 shows an environment history display object 10 provided with environment changed parts (21, 22, 23) and a two-dimensional code and FIG. 2 shows an environment history display object 11 provided with environment changed parts (24, 25) and a bar code (a one-dimensional code).

The environment changed part denotes apart in which ink the color of which changes due to an environmental condition in temperature, humidity, vibration, gas, atmospheric pressure and others is printed. A position, a contour, size and the number of the environment changed part are not restricted; however, it is desirable that the environment changed part is apt to be input as an image at the same time as a code in reading data. For example, it is desirable that its position is located in vicinity of the code. The contour may be a square, a rectangle, a circle, an ellipse and a rounded rectangle, and is especially restricted. It is desirable that the size is larger than size of a bar and a dot of the code. In addition, the part may also be enlarged so that the part is apt to be visually verified.

In addition, to simultaneously grasp plural environmental conditions, plural environment changed parts different in a condition of a change may also be arranged. For example, combinations of parts that change at mutually different temperature and parts that change at different environmental indexes such as temperature and humidity are conceivable. Plural parts may also have the same contour and the same size; however, plural parts different in a contour and size may also be arranged. As data may be linearly read when the code is one-dimensional, it is desirable that height of the environment changed parts (24, 25) is aligned with length of the bar of the bar code 13 and that in addition, a row of the environment changed parts (24, 25) is arranged in the same direction as arrangement of the bars as shown in FIG. 2; however, the present invention is not limited to the arrangement.

For materials configuring the environment changed part, for example, spiropyrans, ethylene derivative pigment acquired by substituting a condensed aromatic ring such as bianthrone and dixanthylene and others are heretofore used when the environment changed part is changed at temperature. In addition, a color change has a reversible type and an irreversible type. The reversible type means a type that color changes many times as temperature rises or lowers and the irreversible type means a type that when color changes at certain temperature, the color cannot be restored. In the case of the irreversible type, ink the viscosity of which changes due to temperature is made to permeate in permeable material for example and color of the ink can be changed when the ink is exposed to temperature equal to or higher than set temperature for fixed time. This embodiment is not limited to these materials, the type and the configuration of the permeable material, and if only color changes due to an environmental change such as a change of temperature, any material, any type and any configuration may be adopted.

Moreover, when color of the environment changed part has a property that the color cannot be recovered when the color once changes, a halfway condition can be known. In addition, in the case of a color change having neutral color, intermediate temperature and humidity and others can also be grasped.

In the one-dimensional code and the two-dimensional code, a character string such as numerals and an alphabet is expressed by a pattern. In this embodiment, information related to determination criteria of whether record and transmission of image data of the environment changed part are required or not is included in the character string. However, a pattern of the two-dimensional code shown in FIG. 1 and a pattern of the one-dimensional code shown in FIG. 2 do not express an actual character string according to this embodiment. Details of a character string being an object of this embodiment will be described later. As for a code, various standards exist in addition to difference in a dimension; however, the present invention does not depend upon such standards. In addition, various processing for conversion are performed when a character string is patterned; however, the present invention does not depend upon such processing methods.

The environment history display object can be used by directly printing it on a commodity and its wrapping paper. In addition, the environment history display object may also be used by printing it on a label and pasting the label on a commodity. Moreover, a character string expressing a code may also be printed in the vicinity in the form of characters. As for changing color, it is desirable that explanation of color when an environmental condition is in a suitable range and color when the environmental condition deviates from the condition is added in the form of characters and others.

The one-dimensional code or the two-dimensional code according to this embodiment is provided with information related to criteria for determining whether image data of the environment changed part is to be recorded or not or whether the image data is to be transmitted or not.

Its concrete method will be described below. The simplest method is a method of expressing criteria for recording and transmitting image data of the environment changed part and others as a character string as it is in addition to a code expressing a commodity in a character string and others. For example, a character string such as "1234567;count=3;red1, 90,blue1,17,green1,51,red2,76,blue2, 25,green 2,15,red3, 10,blue3,94,green3,73" can be given. "1234567" denotes a code expressing a commodity and the normally used code is utilized as it is. "count=3" denotes that three types of an environment changed parts exist. A case that no environment changed part exists can be displayed as zero (0) and a part except the commodity code can also be all omitted. "red1, 90,blue1,17,green1,51,red2,76,blue2,25,green2,15,red3,10, blue3,94,green3,73" denotes determination criteria for recording or transmitting image data. A case that values of red, blue and green in color data of the first environment changed part are respectively larger than 90, 17, 51, values of red, blue and green in color data of the second environment changed part are respectively larger than 76, 25, 15 and values of red, blue and green in color data of the third environment changed part are respectively larger than 10, 94, 73 denotes that image data is recorded or transmitted. In this embodiment, for a condition of the values in the color data of each environment changed part, AND condition is adopted; however, another condition such as OR condition, NAND condition and XOR condition may also be adopted, and in that case, it is desirable that information of a character string related to the condition is added. In addition, in this embodiment, the determination criteria for recording and transmitting image data are not limited to color data of the environment changed part, and for example, determination may also be made using the code denoting the commodity.

When deviation from managed environment occurs, image data of the environment changed part can be recorded or transmitted by using the environment history display object provided with the one-dimensional code or the two-dimensional code including the criteria for recording and transmitting the image data in the case of the deviation from the managed environment described above and the environment changed parts. As a result, proof that the deviation from the managed environment occurs can be left in the image data. In addition, as image data of the environment changed part is recorded or transmitted only in the case of deviation from managed environment, a used amount of a memory can be reduced. Moreover, when image data of the environment changed part is transmitted only in the case of deviation from managed environment, communication time can be transmitted.

The abovementioned environment history display object is read by a data processing device such as a reader on the basis of operation of operators that handle merchandise at stages of manufacture, distribution and consumption, and the data is recorded or transmitted. Details of a reading method and a reading processing method will be described in a third embodiment.

Roughly, first, the one-dimensional code or the two-dimensional code and the environment changed parts are read in a format of image data and are recorded. Next, a character string in the one-dimensional code or the two-dimensional code is read from the read image data and information included in the one-dimensional code or the two-dimensional code is acquired. Data related to the determination criteria for recording and transmitting the image data of the environment changed parts and others is extracted from the acquired information. It is determined on the basis of the determination criteria whether transmission or record of the image data of the environment changed parts is required or not. On the basis of a result of the determination, only data of the character string and the code or data of the character string and the code and the image data are transmitted.

For example, the following data processing device can be used for the abovementioned data processing.

The data processing device is provided with a code recognition unit, a determination unit and a storage or a transmitter. The code recognition unit acquires information included in the one-dimensional code or the two-dimensional code from image data of the read environment history display object. The determination unit determines whether record or transmission of the image data is required or not on the basis of information related to determination criteria acquired by the code recognition unit. The storage records the image data on the basis of a result of the determination by the determination unit. The transmitter transmits the image data on the basis of the determination result by the determination unit. The data processing device may also be further provided with a reader that reads the environment history display object as image data. A reader outside the data processing device reads the image data and the data processing device may also receive the image data from the reader.

When the data processing device integrated with the reader is used, only selected data is sent to a management device and a server that total and record results read by each unit. The data processing device may also be integrated with the management device. When the data processing device is integrated with the management device, the management device selects and stores data requiring recording out of data read by the reader.

Data transmitted from each unit is sent to the management device and the server and is recorded there. The corresponding data can be retrieved from the recorded data using whether the current situation exceeds an environment changed range originally supposed or not, a specific period, a specific commodity code, a specific reader number and others for a condition. When the retrieval result is referred and analyzed, a range in which environment of a commodity is originally outside supposition can be known and knowledge of the range outside supposition can be made good use of improvement of a quality management method.

When the reader holds data related to color determination beforehand, it can be determined in reading whether quality management is satisfactory or not without transmitting data and when the quality management is unsatisfactory, processing that warning is displayed or an alarm is sounded can be performed. In addition, a determination value is included in a character string expressed in the one-dimensional code or the two-dimensional code and determination can also be made using the value.

When data exceeding the environment changed range is retrieved or when data close to the environment changed range is retrieved, image data recorded correspondingly so as to grasp a concrete situation can also be displayed. In addition, these data can also be transmitted to related departments. When the data exceeding the environment changed range including the image data is transmitted, a concrete situation may be apt to be grasped more than only coded aggregated data and the improvement of the quality management method may be facilitated.

Moreover, a case that a criterion is different every commodity can also be processed by the same device and the same algorithm by providing the determination criteria of whether record or transmission of the image data is required or not to not the data processing device to but an environment management display object.

Second Embodiment

In a second embodiment, a case that a one-dimensional code or a two-dimensional code is provided with criteria for recording and transmitting image data of an environment changed part and information of any of the number, types and positions of environment changed parts will be described. Only a part different from the first embodiment will be described below.

The simplest method of providing the criteria for recording and transmitting image data of the environment changed part and the information of any of the number, the types and the positions of the environment changed parts to the one-dimensional code or the two-dimensional code is a method of expressing the number, the types and the positions of the environment changed parts and the determination criteria for recording and transmitting the image data of the environment changed part as a character string as they are in addition to a code denoting a commodity and others in the character string. For example, a character string such as "1234567;count=3;temperature 10,10.2,0.1;temperature20, 10.2,00.2;moisture,1.2,00.3;red1,90,blue1,17,green1,51, red2,76,blue2,25,green2,15,red3,10,blue3,94,green3,73" can be given. "1234567" denotes a code showing a commodity and a normally used code is utilized as it is. "count=3" denotes that three types of environment changed parts exist. A case that no environment changed part exists can be displayed as zero (0) and a part except the commodity code can also be all omitted. "temperature 10,1.2,0.1" denotes that a changed part that changes at temperature of 10 degrees exists in a position of 1.2 in a lateral direction and 0.1 in a longitudinal direction. The position can also be expressed by actual length such as mm; however, it is desirable that the position is expressed as a relative position utilizing a reference position of the code. In this example, a coordinate system having a reference point on the upper right side as 1 in a lateral direction and a reference point on the lower left side as 1 in a longitudinal direction is set with a reference point on the upper left side of a two-dimensional code 12 as origin, and a central position of each environment changed part is expressed on this coordinate system. When this method is utilized, the environment changed part can be read even if the environment changed part is arranged in an arbitrary position. "red1,90,blue1,17,green1,51,red2,76, blue2,25,green2,15,red3,10,blue3,94,green3,73" denotes the determination criteria for recording and transmitting image data. When values of red, blue and green in color data of the environment changed parts corresponding to "temperature 10,1.2,0.1" are respectively equal to or larger than 90, 17, 51, values of red, blue and green in color data of the environment changed parts corresponding to "temperature 20,1.2,0.2" are respectively equal to or larger than 76, 25, 15 and values of red, blue and green in color data of the environment changed parts corresponding to "moisture,1.2, 0.3" are respectively equal to or larger than 10, 94 and 73, the values denote that image data is recorded or transmitted.

In the abovementioned method, a character string displayed in a code part becomes long and size of an area required for display of the code is enlarged. This problem can be solved by encoding expressed contents. For example, when it is determined beforehand that "temperature 10" is denoted as "T1", "temperature 20" is denoted as "T2", "moisture" is denoted as "M", "red1" is denoted as "R1", "blue1" is denoted as "B1", "green1" is denoted as "G1", coordinates are multiplied by 10 times and are expressed in two digits, the abovementioned character string can be shortly expressed as "1234567;count=3;T11201;T21202; M1203;R190B117G151R276B225G215R310B 394G373". Further, "count=3" can be reduced by encoding it and omission can also be made by utilizing numbers in parts of types and coordinates.

When such an approach is further promoted, a method of utilizing a commodity code itself for a code denoting the environment changed part is considered. For example, a method of expressing the number of the environment changed parts by one character at the head of a commodity code and expressing a type by second and third characters can be given. As it is rather difficult to express a position in the commodity code, it is desirable that a position for each number is determined beforehand. That is, the position for each number is determined in such a manner that a case of one piece is 1.2 in a lateral direction and is 0.1 in a longitudinal direction, a case of two pieces is 1.2 in the lateral direction and is 0.2 in the longitudinal direction, and a case of three pieces is 1.2 in the lateral direction and is 0.3 in the longitudinal direction. When this is determined beforehand, positional data is not required to be included in a character string. This method can also be utilized in the unencoded method first described. As length of an expressable character string is restricted when a code is a one-dimensional code, this method is especially effective.

When a code is a one-dimensional code, length of an expressable character string is restricted. In addition, reading processing may be performed on a straight line in a horizontal direction shown in FIG. 2. Then, it is desirable that environment changed parts (24, 25) are arranged in the lateral direction so that they cross the straight line supposed that the line is used for reading. In addition, it is desirable that size in the longitudinal direction of the environment changed part has the similar length to a bar in a bar code. Moreover, when coordinate values of a position are expressed, only a coordinate in the lateral direction may also be expressed.

Figure 3:
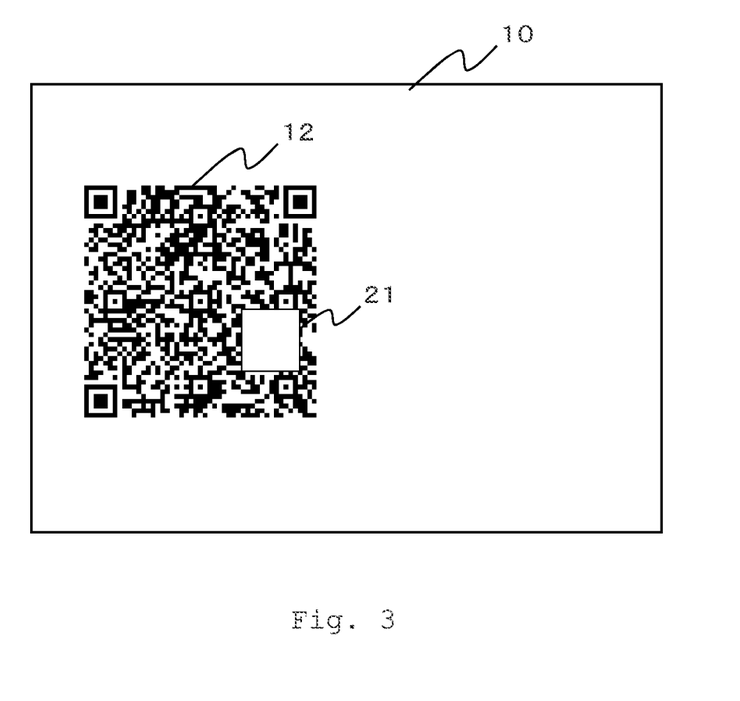
FIG. 3 shows an environment history display object according to the first embodiment.

The case that the environment changed parts are arranged outside to prevent the parts from being overlapped with the one-dimensional code or a two-dimensional code has been described. When a two-dimensional QR code (a trademark) format and others are utilized, set character string data can be read even if a part of the code lacks because an error correction rule of data exists. Then, an environment changed part can also be arranged inside a code as shown in FIG. 3. This can be realized by only setting coordinates between 0 to 1 both in the lateral and longitudinal direction.

In the abovementioned example, only the commodity code is expressed in a leading part of the character string; however, URL for accessing to a specific site, for example, a character string such as "http://www.***.com/code.aspx?ID=1234567;count=3;temperature 10,1.2,0.1;temperature 20,1.2,0.2;moisture,1.2,0.3;red1,90,blue1,17, green1,51,red2,76,blue2,25,green2,15,red3,10,blue3,94, green3,73" can also be expressed. Contents of these display modes are not limited in the present invention.

Next, a method of reading an environment history display object and a data processing device respectively according to this embodiment will be described. First, a one-dimensional code or a two-dimensional code and environment changed parts are read and recorded in a format of image data. Next, a character string in the one-dimensional code or the two-dimensional code is read from the image data, and data related to a commodity code, the number, types and positions of the environment changed parts, determination criteria of whether record and transmission of the image data of the environment changed part are required or not and others are extracted from the character string. Next, color data in the environment changed part is read, and a management number of a commodity and the color data are recorded. Determination is made on the basis of the color data and the determination criteria, and on the basis of a determination result, only the character string and data in the code or the character string, data in the code and the image data are transmitted.

Except the abovementioned data processing, the following data processing device can be used for example.

The data processing device is provided with a code recognition unit, an environment changed parts arrangement determination unit, an environment changed part recognition unit, a determination unit and a storage or a transmitter. The environment changed parts arrangement determination unit extracts information of any of the number, types and positions of environment changed parts from information acquired by the code recognition unit. The environment changed part recognition unit recognizes the environment changed part on the basis of the information extracted by the arrangement determination unit.

According to this embodiment, the following effects can be acquired. An environment changed situation of an article different in the number, types and positions of the environment changed parts can be read by a one type of reader or a reading method. In addition, a situation of an environmental change in transporting and storing the article can be grasped by the read data. A location in which unstable management is made is known by utilizing a result of the reading and improvement of a management method is facilitated. Further, automatic adjustment of a data storage amount or a transmission amount is enabled and the reduction of memory consumption and a communication rate is enabled.

Third Embodiment

Figure 4:
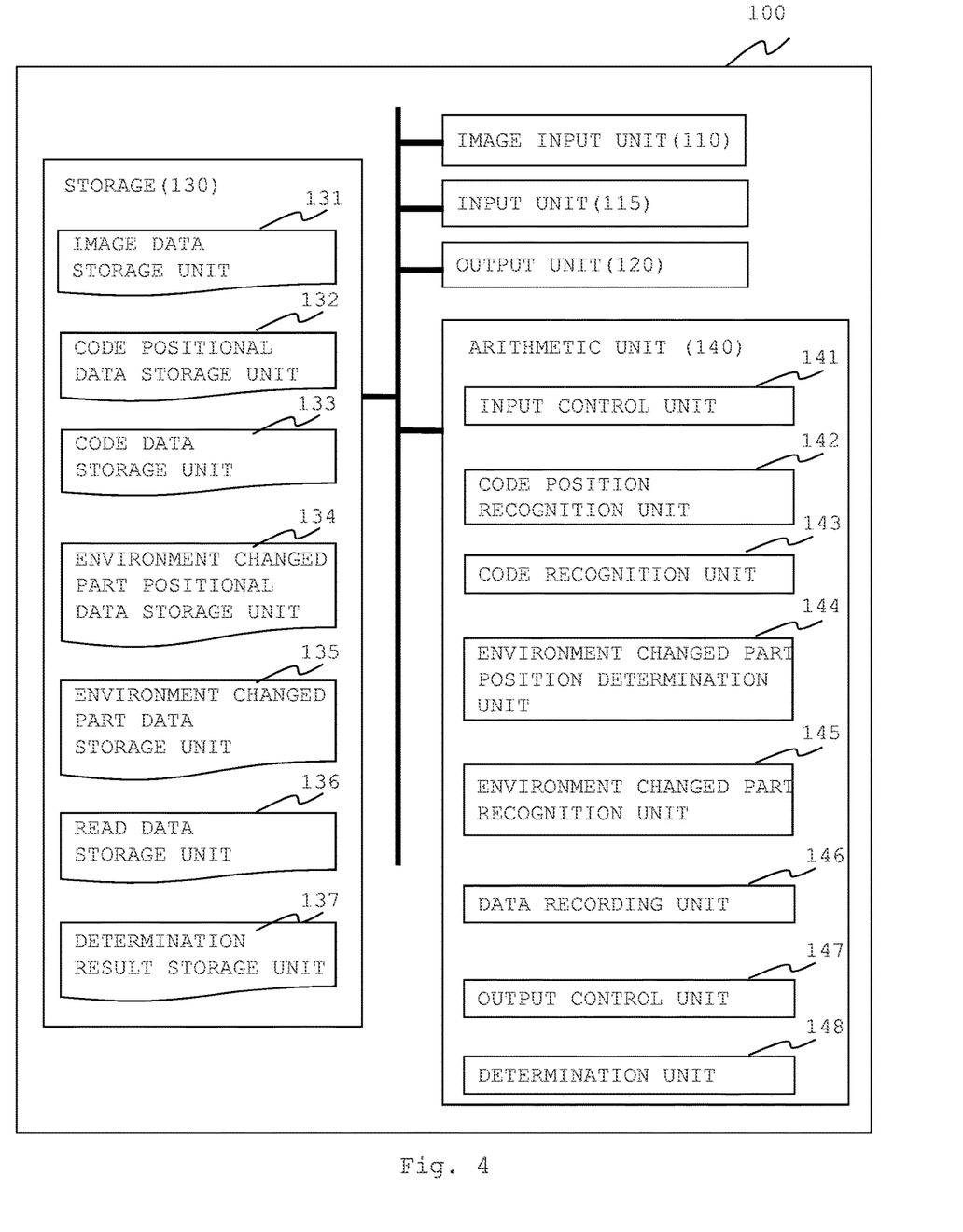
FIG. 4 is a block diagram showing a configuration of a data processing device according to the first embodiment.

FIG. 4 is a block diagram showing one example of a data processing device (100) that reads the environment history display object described in the second embodiment as data. The data processing device is provided with an image input unit 110, an input unit 115, an output unit 120, a storage 130 and an arithmetic unit 140.

The image input unit 110 is a so-called camera for inputting an image and when a one-dimensional or two-dimensional code and environment changed parts are imaged, the images are recorded in an image data storage unit 131 in the storage 130.

The input unit 115 is a part for accepting instructions of an operator and is configured by a button or a touch panel and others.

The output unit 120 is a unit that outputs instruction information for the operator, a read image, a result of reading and others and is configured by a display and a communication device. This configuration is a standard one and any or all of the image input unit, the input unit and the output unit may also be connected to external ports of the data reader 100.

The storage 130 is a part that stores various data and is configured by the following storage units.

The image data storage unit 131 is a part that stores images of a code and the environment changed parts respectively input from the image input unit 110.

A code positional data storage unit 132 is a part that stores data expressing a reference position of a code recognized by a code position recognition unit 142 described later on the basis of the images recorded in the image data storage unit 131.

A code data storage unit 133 is a part that stores data of a character string expressed in a code recognized by a code recognition unit 143 described later on the basis of the images recorded in the image data storage unit 131.

An environment changed part positional data storage unit 134 is apart that stores data expressing a position of the environment changed part determined by an environment changed part position determination unit 144 described later. As for this data, when no environment changed part exists, no data is stored, when the one environment changed part exists, one piece of data is stored, and when plural environment changed parts exist, plural data are stored.

An environment changed part data storage unit 135 is a part that stores color data extracted by an environment changed part recognition unit 145 described later. The color data are recorded by the number of data recorded in the environment changed part positional data storage unit 134.

A read data storage unit 136 is a part that stores data generated and recorded by a data recording unit 146 described later. This data is acquired by synthesizing data stored in the code data storage unit 133 and data stored in the environment changed part data storage unit 135.

The arithmetic unit 140 processes data input from the image input unit 110 and the input unit 115 and data stored in the storage 130, outputs its result to the output unit 120 or records its result in the storage 130, and the arithmetic unit is configured by the following processing units.

An input control unit 141 classifies data input from the image input unit 110 or the input unit 115 into an instruction, data and others, and transfers them to the units in the storage and the arithmetic unit.

The code position recognition unit 142 recognizes a position in which a code is included on the basis of data of an image recorded in the image data storage unit 131 and records a recognition result in the code positional data storage unit 132. Image data is normally configured by several hundreds or several thousands of dots both longitudinally and laterally and an image itself has no data of which part is a code. Then, color data of each dot is analyzed and it is recognized to which part of image data a reference position of a code is equivalent. A display mode and the number of reference positions are different depending upon a standard of the code; however, the present invention is not limited to such a standard. It is desirable that the recognition result is expressed by a position of the dot in the image data, that is, coordinates values such as in which position in a right direction from the left the dot exists and in which position in a down direction from the upside the dot exists.

The code recognition unit 143 recognizes data of a character string expressed in a code on the basis of image data recorded in the image data storage unit 131 utilizing positional data recorded in the code positional data storage unit 132, and records the data of the character string in the code data storage unit 133.

The environment changed part position determination unit 144 determines a position of the environment changed part utilizing positional data recorded in the code positional data storage unit 132 and character string data recorded in the code data storage unit 133, and records the position in the environment changed part positional data storage unit 134. The character string data recorded in the code data storage unit 133 includes information such as a commodity code, the number, types and positions of the environment changed parts, and the position is determined utilizing these. The most desirable method is a method of calculating the position of the environment changed part utilizing a coordinate system having a reference position of the code as reference.

Figure 5:
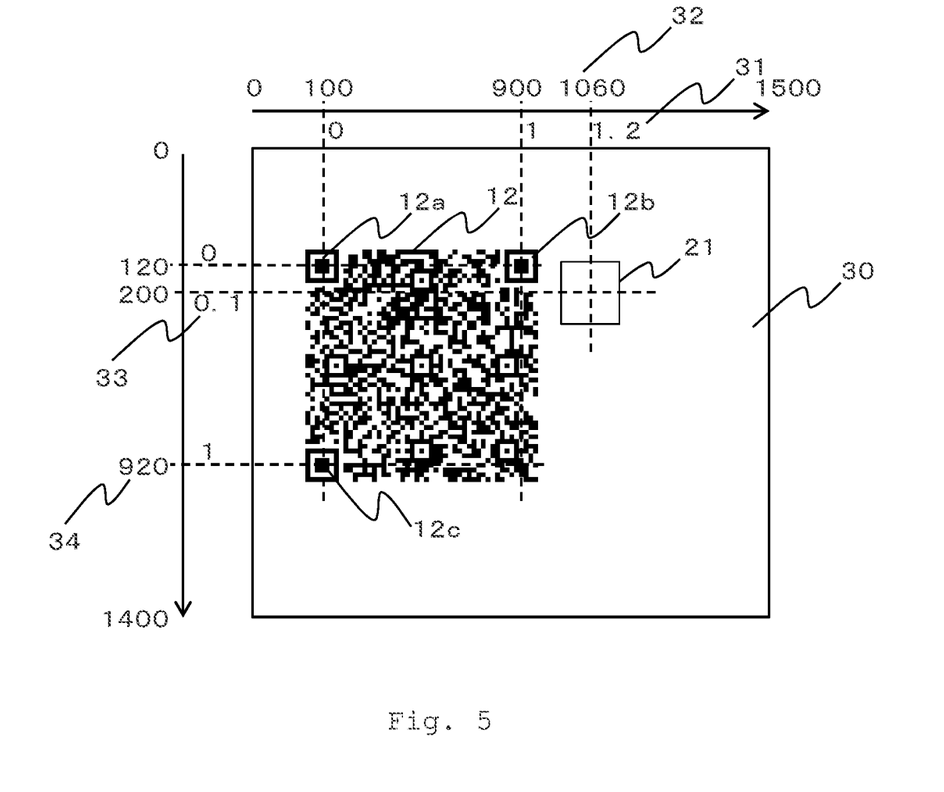
FIG. 5 shows an image of image data according to the first embodiment.

FIG. 5 shows an image of image data. A two-dimensional code 12 and an environment changed part 21 are recorded inside a memory 30 where dots are arranged in a matrix the longitudinal direction of which is 1400 and the lateral direction of which is 1500. Three reference positions (12a, 12b, 12c) in the two-dimensional code are respectively located in 100 in the lateral direction and 120 in the longitudinal direction, are located in 900 in the lateral direction and 120 in the longitudinal direction, and are located in 100 in the lateral direction and 920 in the longitudinal direction respectively in dot positions in the image data. At this time, when coordinates of the one environment changed part 21 are expressed as 1.2 in the lateral direction and 0.1 in the longitudinal direction in a character string in the two-dimensional code, it can be calculated that the environment changed part is located in 1060 ((900−100)×1.2+100) in the lateral direction and 200 ((920−120)×0.1+120) in the longitudinal direction.

Referring to FIG. 4 again, the environment changed part recognition unit 145 extracts color data of the environment changed part from the image data recorded in the image data storage unit 131 on the basis of the positional data recorded in the environment changed part positional data storage unit 134 and records the color data in the environment changed part data storage unit 135. As described above, if the positional data is expressed as a position of a dot in the image data, processing can be performed by only reading data in the dot in the corresponding position. That is, processing that the color data in the dot located in 1060 in the lateral direction and 200 in the longitudinal direction can be read is performed. It is also desirable to remove noise data that size of the environment changed part is made larger than an interval between dots, data in circumferential several dots are read, and processing such as averaging is performed. The color data can also be processed in a binary such as white and black; however, the color data may also be processed in multilevel gradation including a halftone and in color.

The data recording unit 146 combines the character string data recorded in the code data storage unit 133 and the color data recorded in the environment changed part data storage unit 135 and records it in the read data storage unit 136. Generally, in grasping an environment changed situation of a commodity, it is desired that information of when, where and what occurs is gathered. Then, it is desirable that a date when reading processing is performed, a number of a reader and others are recorded in addition to the character string data and the color data respectively described above. As the number of the reader is unchanged as long as the same reader is utilized, the number may also be added in data output described later. In addition, apart not required for grasping the environment changed situation such as a part expressing a position of the environment changed part is not required to be included in the record.

An output control unit 147 is apart that outputs the data recorded in the read data storage unit 136 to the output unit 120. When an output destination is a screen and others, it is desirable that every time reading operation is performed, a result is output. In addition, at this time, it is desirable that it is determined from color of the environment changed part utilizing determination criteria data separately provided whether an environmental condition is satisfactory or not and its result is output. When the output destination is a communication destination and others, output processing may also be performed every time reading operation is performed and processing may also be performed by putting data for several times together and putting data every time determined beforehand together.

A determination unit 148 determines whether transmission of the image data recorded in the image data storage unit 131 is required or not on the basis of the code recorded in the code data storage unit 133, the determination criteria for recording and transmitting the image data of the environment changed part and the color data of the environment changed part recorded in the environment changed part data storage unit 135. A result of the determination of whether the transmission of the image data is required or not is recorded in a determination result storage unit 137 of whether the transmission of the image data is required or not.

In this embodiment, the storage 130 and the arithmetic unit 140 are mounted in the data processing device 100; however, the present invention is not limited to this configuration. For example, image data is read by a reader, the data is transferred to another device such as a server, and the following processing may also be all performed in the device.

Figure 6:
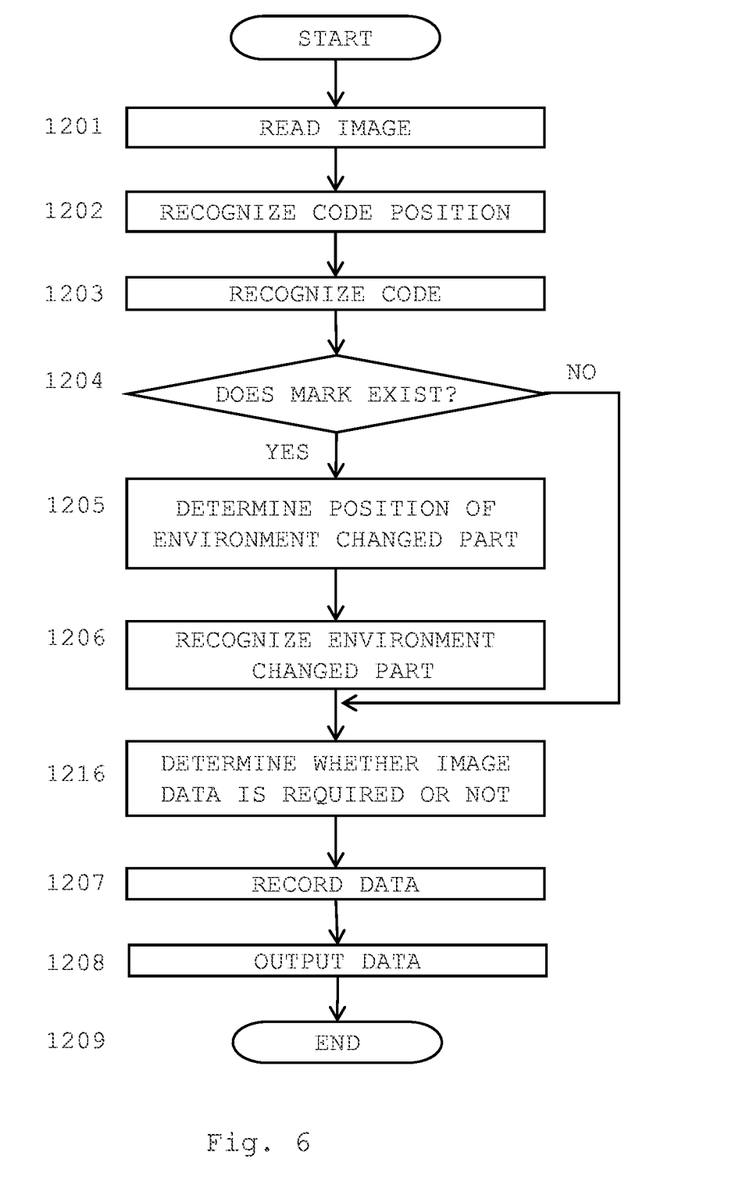
FIG. 6 shows a procedure of a data processing method.

FIG. 6 shows a flow of a process executed by the data processing device 100.

First, image data including a code and an environment changed part is input from the image input unit 110 according to an instruction from the input control unit 141 and the data is recorded in the image data storage unit 131 (procedure 1201).

Next, the image data recorded in the image data storage unit 131 is transferred to the code position recognition unit 142, a reference position of the code is recognized, and its result is recorded in the code positional data storage unit 132 (procedure 1202).

In addition, the image data recorded in the image data storage unit 131 and the positional data recorded in the code positional data storage unit 132 are transferred to the code recognition unit 143, character string data expressed by the code is recognized on the basis of the positional data, and its result is recorded in the code data storage unit 133 (procedure 1203).

Next, it is determined on the basis of the character string data recorded in the code data storage unit 33 whether the environment changed part exists or not and only in a case that the environment changed part exists, processing in the following procedures 1205, 1206 is performed (procedure 1204).

When the environment changed part exists, the positional data recorded in the code positional data storage unit 132 and the character string data recorded in the code data storage unit 133 are first transferred to the environment changed part position determination unit 144, a position of the environment changed part is determined, and the position is recorded in the environment changed part positional data storage unit 134 (procedure 1205). A method of determining the position is described above.

Next, the positional data recorded in the environment changed part positional data storage unit 134 and the image data recorded in the image data storage unit 131 are transferred to the environment changed part recognition unit 145, data of a position expressed by the positional data in the image is extracted, and the data is recorded in the environment changed part data storage unit 135 (procedure 1206).

Next, the code recorded in the code data storage unit 133, determination criteria for recording and transmitting image data of the environment changed part and color data of the environment changed part recorded in the environment changed part data storage unit 135 are transferred to the determination unit 148 of whether the image data is required or not, it is determined whether transmission of the image data is required or not, and a determination result is recorded in the determination result storage unit 137 of whether the image data is required or not (procedure 1216).

Next, processing performed independent of whether the environment changed part exists or not is performed. First, the character string data recorded in the code data storage unit 133, the color data recorded in the environment changed part data storage unit 135, the image data recorded in the image data storage unit 131 and the determination result of the image data recorded in the determination result storage unit 137 of whether the image data is required or not are transferred to the data recording unit 146. Next, when the determination result of the image data recorded in the determination result storage unit 137 is "required", the character string data recorded in the code data storage unit 133, the color data recorded in the environment changed part data storage unit 135 and the image data recorded in the image data storage unit 131 are combined and synthesized, and its result is recorded in the read data storage unit 136 1207. Conversely, when the determination result of the image data recorded in the determination result storage unit 137 is "not required", the character string data recorded in the code data storage unit 133 and the color data recorded in the environment changed part data storage unit 135 are combined and synthesized, and its result is recorded in the read data storage unit 136 (procedure 1207). In this synthesizing processing, when no environment changed part exists, data expressing "nothing" is combined according to a format determined beforehand or simply, a part of color data of the environment changed part is nullified.

Finally, the data recorded in the read data storage unit 136 is transferred to the output control unit 147 and is output to the output unit 120 (procedure 1208).

It is desirable as to the device according to this embodiment that a program for realizing the abovementioned method is executed on a general purpose smartphone provided with a camera, a screen and a communication device and others. However, the present invention is not limited to this mode.

LIST OF REFERENCE SIGNS

10, 11—Environment history display object, 12—Two-dimensional code, 13—Bar code, 21, 22, 23, 24, 25—Environment changed part, 100—Processing device, 110—Image input unit, 115—Input unit, 120—Output unit, 130—Storage, 131—Image data storage unit, 132—Code positional data storage unit, 133—Code data storage unit, 134—Environment changed part positional data storage unit, 135—Environment changed part data storage unit, 136—Read data storage unit, 137—Determination result storage unit, 140—Arithmetic unit, 141—Input control unit, 142—Code position recognition unit, 143—Code recognition unit, 144—Environment changed part position determination unit, 145—Environment changed part recognition unit, 146—Data recording unit, 147—Output control unit, 148—Determination unit

The invention claimed is:

1. An environment history label, comprising:
an environment changed part having a color that changes in response to an environmental condition; and
a one-dimensional code or a two-dimensional code,
wherein the one-dimensional code or the two-dimensional code includes information indicating whether recording or transmission of image data of the environment changed part is required.

2. The environment history display object according to claim 1,
wherein the one-dimensional code or the two-dimensional code is further provided with information of any of the number, types and positions of the environment changed part.

3. A data processing device which is a data reading processing device for the environment history display object according to claim 1, comprising:
a code recognition unit that acquires the information included in the one-dimensional code or the two dimensional code from the image data of the read environment history display object;
a determination unit that determines whether the record or the transmission of the image data is required on the basis of the information related to the determination criteria acquired from the code recognition unit; and
a storage unit that records the image data on the basis of a determination result by the determination unit or a transmitting unit that transmits the image data.

4. The data processing device according to claim 1, further comprising a reading unit that reads the environment history display object as image data.

5. The data processing device according to claim 3,
wherein the one-dimensional code or the two-dimensional code provided to the environment history display object is further provided with information of any of the number, types and positions of the environment changed parts, and
wherein the data processing device further comprises:
an environment changed part position determination unit that extracts information of any of the number, the types and the positions of the environment changed parts from information acquired from the code recognition unit; and
an environment changed part recognition unit that recognizes the environment changed part on the basis of the information extracted from the environment changed part position determination unit.

6. A data processing method of the environment history display object according to claim 1, comprising:
reading the environment history display object as image data;
acquiring information included in the one-dimensional code or the two-dimensional code from the read image data of the environment history display object;
determining whether record or transmission of the image data is required on the basis of the information related to the determination criteria in the acquired information; and
recording or transmitting an image on the basis of a determination result.

7. The data processing method of the environment history display object according to claim 6,
wherein the one-dimensional code or the two-dimensional code provided to the environment history display object is further provided with information related to any of the number, types and positions of the environment changed parts;
the information related to any of the number, the types and the positions of the environment changed parts from the acquired information is extracted; and
the environment changed parts are recognized on the basis of the extracted information related to any of the number, the types and the positions of the environment changed parts.

* * * * *